(12) United States Patent
Davis et al.

(10) Patent No.: US 12,392,576 B2
(45) Date of Patent: *Aug. 19, 2025

(54) BLASTER WITH ACCESSORY POWER CONNECTION AND INTERCHANGEABLE NOZZLE COMPONENTS

(71) Applicant: Gel Blaster, Inc., Austin, TX (US)

(72) Inventors: Eric Davis, Austin, TX (US); Colin Guinn, Austin, TX (US); Robert Kovacs, Austin, TX (US)

(73) Assignee: GO PLAY. HOLDINGS INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,348

(22) Filed: Dec. 28, 2023

(65) Prior Publication Data

US 2025/0027744 A1 Jan. 23, 2025

Related U.S. Application Data

(63) Continuation of application No. 17/952,173, filed on Sep. 23, 2022, now Pat. No. 11,859,941.

(60) Provisional application No. 63/248,007, filed on Sep. 24, 2021.

(51) Int. Cl.
| | |
|---|---|
| *F41B 11/70* | (2013.01) |
| *F41B 11/52* | (2013.01) |
| *F41G 1/35* | (2006.01) |
| *G02B 27/20* | (2006.01) |

(52) U.S. Cl.
CPC .............. *F41B 11/70* (2013.01); *F41B 11/52* (2013.01); *G02B 27/20* (2013.01)

(58) Field of Classification Search
CPC . F41G 1/34; F41G 1/35; F41G 11/001; F41B 11/52; F41B 11/70; F41B 11/71; F41B 11/89; F41A 21/32; G02B 27/20
USPC ............. 42/54, 146; 446/473, 485; 362/110; 124/1, 49, 71, 80
See application file for complete search history.

(56) References Cited

U.S. PATENT DOCUMENTS

| | | | | |
|---|---|---|---|---|
| 689,547 | A | * 12/1901 | James | ....................... F41G 1/34 |
| | | | | 362/113 |
| 1,045,800 | A | * 11/1912 | Lewis | ....................... F41G 1/35 |
| | | | | 362/114 |

(Continued)

FOREIGN PATENT DOCUMENTS

CN 210786252 U 6/2020

OTHER PUBLICATIONS

International Search Report and Written Opinion issued in PCT/US22/44624.

*Primary Examiner* — Alexander R Niconovich
(74) *Attorney, Agent, or Firm* — Jeffer Mangels Butler & Mitchell LLP; Brennan C. Swain, Esq.

(57) ABSTRACT

Nozzles, nozzle assemblies, and blaster assemblies featuring interchangeable nozzles having externally powered electrical components or accessories. A nozzle assembly may include a body. The body may have a projectile opening defined therethrough. The nozzle assembly may further include an electrical component that is attachable to the body. The nozzle assembly may further include an electrical connection member coupled to the body and the electrical component. The electrical connection member may be configured to electrically connect the electrical component to the blaster.

16 Claims, 12 Drawing Sheets

(56) References Cited

U.S. PATENT DOCUMENTS

| | | | | |
|---|---|---|---|---|
| 1,083,073 A * | 12/1913 | Feruson et al. | ............ | F41G 1/35 362/114 |
| 1,107,040 A * | 8/1914 | Conde | ................ | F41G 1/34 362/110 |
| 1,120,769 A * | 12/1914 | Villarejo | .................. | F41G 1/35 362/114 |
| 1,149,705 A * | 8/1915 | Ward | ..................... | F41G 1/34 42/146 |
| 1,150,796 A * | 8/1915 | Ward | ..................... | F41G 1/35 362/187 |
| 1,201,052 A * | 10/1916 | Jakubyansky | ............ | F41G 1/35 42/84 |
| 1,215,171 A * | 2/1917 | Lewis | ..................... | F41G 1/35 42/114 |
| 1,262,270 A * | 4/1918 | Schmidt et al. | .......... | F41G 1/35 362/184 |
| 1,263,667 A * | 4/1918 | Henderson et al. | ...... | F41G 1/35 362/114 |
| 1,338,239 A * | 4/1920 | Matys | ..................... | F41C 23/22 362/114 |
| 1,615,409 A * | 1/1927 | Selden | ..................... | F41G 1/35 362/114 |
| 1,993,979 A * | 3/1935 | Reed | ......................... | F41G 1/35 362/113 |
| 2,017,585 A * | 10/1935 | Casey | ..................... | F41G 1/35 362/114 |
| 2,069,750 A * | 2/1937 | Coates | ................... | F41G 3/2655 434/19 |
| 2,085,732 A * | 7/1937 | Baxter | .................... | F41G 1/35 42/114 |
| 2,093,514 A * | 9/1937 | Cornett | ................... | F41G 1/35 362/114 |
| 2,209,524 A * | 7/1940 | Key | ......................... | F41G 1/35 42/145 |
| 2,597,565 A * | 5/1952 | Daniel | ................... | F41C 23/16 362/110 |
| 3,114,362 A * | 12/1963 | Hellman | ................. | F41G 1/35 362/113 |
| 3,240,924 A * | 3/1966 | Darby | ................ | F21V 33/0064 362/112 |
| 3,364,345 A * | 1/1968 | Davis | .................... | F41A 33/02 362/281 |
| 3,657,826 A * | 4/1972 | Marshall | .................. | H01S 5/02 434/22 |
| 3,739,167 A * | 6/1973 | Avery | .................... | F21L 14/00 362/110 |
| 3,995,376 A * | 12/1976 | Kimble | ................ | F41G 3/2655 42/114 |
| 4,236,348 A * | 12/1980 | DuLac | .................... | A63H 5/04 362/112 |
| 4,488,369 A * | 12/1984 | Van Note | ................ | F41A 33/02 42/117 |
| 4,542,447 A * | 9/1985 | Quakenbush | ........... | F21V 21/08 362/183 |
| 4,571,201 A * | 2/1986 | Matsuda | ............... | A63H 33/003 446/376 |
| 4,586,715 A * | 5/1986 | Scolari | ...................... | F41J 5/02 434/21 |
| 4,856,218 A * | 8/1989 | Reynolds, Jr. | .......... | F41G 1/345 362/110 |
| 5,040,322 A * | 8/1991 | Iturrey, Jr. | ................ | F41G 1/35 362/110 |
| 5,237,773 A | 8/1993 | Claridge | | |
| 5,584,137 A * | 12/1996 | Teetzel | .................... | F41A 9/62 42/117 |
| 5,727,346 A * | 3/1998 | Lazzarini | ................. | F41G 1/35 42/146 |
| 5,762,058 A * | 6/1998 | Cheng | ................... | F41A 21/32 124/83 |
| 6,048,280 A * | 4/2000 | Palmer | .................... | F41B 11/71 124/16 |
| 6,247,995 B1 * | 6/2001 | Bryan | ................... | B05B 7/2472 435/189 |
| 6,279,562 B1 * | 8/2001 | Clayton | ................ | F41B 9/0018 124/59 |
| 6,298,841 B1 * | 10/2001 | Cheng | .................... | F41A 21/32 102/501 |
| 6,389,730 B1 * | 5/2002 | Millard | .................. | F41A 33/02 42/116 |
| 6,474,507 B1 * | 11/2002 | Hornsby | ............... | F41B 9/0028 222/113 |
| 6,526,688 B1 * | 3/2003 | Danielson | ................ | F41G 1/35 42/117 |
| 6,616,452 B2 * | 9/2003 | Clark | ....................... | F41A 33/02 434/21 |
| 6,622,414 B1 * | 9/2003 | Oliver | .................... | F41A 33/02 42/117 |
| 7,117,627 B2 * | 10/2006 | Woodmansee, III | ..... | F41G 1/00 42/114 |
| 7,303,306 B2 * | 12/2007 | Ross | ...................... | F41C 27/00 362/109 |
| 7,870,851 B2 * | 1/2011 | Mahany | .................. | F41B 11/68 124/56 |
| 7,921,838 B2 * | 4/2011 | Tippmann, Jr. | ......... | F41B 11/62 124/75 |
| 7,954,273 B1 * | 6/2011 | Swan | ....................... | F41G 1/35 42/117 |
| 8,191,302 B1 * | 6/2012 | Swan | ...................... | F41G 1/033 42/117 |
| 8,371,282 B2 * | 2/2013 | Meggs | ................... | F41B 11/641 124/56 |
| 8,485,858 B2 * | 7/2013 | Wei | ...................... | F41B 11/89 446/473 |
| 8,590,519 B2 * | 11/2013 | Barish | .................... | F41B 11/52 124/69 |
| 8,596,255 B2 * | 12/2013 | Meggs | .................... | F42B 6/10 124/56 |
| 8,695,266 B2 * | 4/2014 | Moore | ..................... | F41G 1/44 356/249 |
| 8,844,189 B2 * | 9/2014 | Moore | ..................... | F41G 1/35 42/117 |
| 9,067,127 B2 * | 6/2015 | Clark | ...................... | F41A 33/02 |
| 9,267,758 B2 * | 2/2016 | Risicato | .................... | F41G 1/35 |
| 10,088,269 B2 * | 10/2018 | Sheets, Jr. | .............. | F41A 35/00 |
| 10,132,485 B2 * | 11/2018 | Tuller | ...................... | F41G 1/35 |
| 10,488,146 B2 * | 11/2019 | Quek | ....................... | F42B 6/00 |
| 10,955,217 B2 * | 3/2021 | Saadon | ................... | F41C 23/14 |
| 11,112,217 B1 * | 9/2021 | Neel | ........................ | F41C 27/00 |
| 11,788,816 B2 * | 10/2023 | Tayon | ................... | F41G 11/003 362/110 |
| 2005/0086847 A1 * | 4/2005 | Paulkovich | ............... | F41G 1/35 42/114 |
| 2005/0246937 A1 * | 11/2005 | Kim | ..................... | F41G 11/003 42/146 |
| 2006/0180134 A1 * | 8/2006 | Illuzzi | ....................... | F41A 9/24 102/502 |
| 2007/0277422 A1 * | 12/2007 | Ding | .................... | F41G 11/003 42/146 |
| 2009/0247043 A1 * | 10/2009 | Liao | ........................ | B05B 15/00 446/405 |
| 2010/0224180 A1 * | 9/2010 | Tippmann, Jr. | ......... | F41B 11/62 124/74 |
| 2012/0152221 A1 * | 6/2012 | Meggs | ..................... | F41A 9/83 206/204 |
| 2013/0152912 A1 * | 6/2013 | Spencer | .................. | F41B 11/57 124/82 |
| 2014/0069406 A1 * | 3/2014 | Hastings | ................ | F41G 11/001 124/80 |
| 2014/0199913 A1 * | 7/2014 | Rosenblum | ................ | F41J 5/02 446/473 |
| 2019/0176048 A1 * | 6/2019 | Ma | ........................ | A63H 29/14 |

* cited by examiner

BLASTER WITH ACCESSORY POWER CONNECTION AND INTERCHANGEABLE NOZZLE COMPONENTS

CROSS REFERENCE TO RELATED APPLICATIONS

This application is a continuation of U.S. patent application Ser. No. 17/952,173, filed Sep. 23, 2022, which claims the benefit of U.S. Provisional Application No. 63/248,007, filed on Sep. 24, 2021, the entireties of which are incorporated by reference herein.

FIELD OF THE INVENTION

The present invention relates to blaster assemblies, particularly to interchangeable blaster nozzles and nozzle accessories having mechanical and electrical features.

BACKGROUND OF THE INVENTION

Blasters that shoot projectiles, such as gel based balls, paint balls, foam ammunition, darts, and the like are generally used as toys, for entertainment, in target practice, and in competitive challenges. The blasters having a heightened shooting accuracy enhances the experience of their users when engaging in such activities. Blasters may have large components such as hoppers, handle variations, and other accessories and add-ons for functionality and/or cosmetic choices. These components may block the view of the users when aiming their blasters. Further, environmental conditions such as low or no light, fog, mist, smoke, poor air quality and the like may contribute to the users having impaired aim. As such, improvements to blasters that improve aim and shooting accuracy are desirable.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

The present invention is directed to nozzles, nozzle assemblies, and blaster assemblies that feature interchangeable or replaceable nozzles and nozzle parts. The nozzles may include electrical components or receive electrical add-ons to improve the aim of a blaster when attached. The components and add-ons may include visibility and/or accuracy enhancing parts such as lights and/or lasers. The nozzles and nozzle parts may be attachable to a tip of a blaster barrel and draw electrical power from a power source of the blaster.

A preferred embodiment is embodied in a nozzle assembly. The nozzle assembly is configured for use with a blaster. The nozzle assembly includes a body. The body has a projectile opening defined therethrough. The nozzle assembly further includes an electrical component attachable to the body. The nozzle assembly further includes an electrical connection member coupled to the body and the electrical component. The electrical connection member is configured to electrically connect the electrical component to the blaster.

This and other embodiments may optionally include the following. The body may have a tunnel defined therein. The tunnel may have an electrical component positioned therein. The body may have three tunnels in a triangular formation defined therein. There may be three electrical components where each electrical component is a laser diode or a light-emitting diode (LED). Each of the three tunnels may have the laser diode or the LED positioned therein. The three tunnels may include an upper tunnel, a lower right tunnel, and a lower left tunnel. The upper tunnel may be vertically aligned with the projectile opening and the lower right and left tunnels may be positioned relative to the projectile opening such that the light projection originating from the laser diode or the LED of each of the lower right and left tunnels indicate a potential end location of a projectile traveling out of the projectile opening.

The body may have a mechanical connection member extending therefrom. The electrical connection member may be integrated with the mechanical connection member. The mechanical connection member may be configured to mechanically couple the nozzle assembly to the blaster and facilitate an electrical connection between the electrical connection member and the blaster simultaneously. The body may have a connection flange extending therefrom. The connection flange may be configured to be inserted into the blaster to reinforce the mechanical coupling between the nozzle assembly and the blaster.

The nozzles assembly may further include a button or a switch. The button or the switch may be coupled to the body and the electrical connection member. The button or the switch may be configured to turn on and turn off power transmitted to the electrical component from the blaster via the electrical connection member.

Another preferred embodiment is embodied in a blaster assembly. The blaster assembly includes a blaster. The blaster has a barrel defining a bore. The blaster further includes a battery. The blaster assembly further includes a nozzle assembly. The nozzle assembly is attachable to the blaster. The nozzle assembly includes a body. The body has a projectile opening defined therethrough. The projectile opening is configured to coincide with the bore when the nozzle assembly is attached to the blaster. The nozzle assembly further includes an electrical component attachable to the body. The nozzle assembly further includes an electrical connection member coupled to the body and the electrical component. The electrical connection member is configured to transmit power from the battery to the electrical component.

This and other embodiments may optionally include the following. The body may have a tunnel defined therein. The tunnel may have an electrical component positioned therein. The body may have three tunnels in a triangular formation around the projectile opening and defined therein. There may be three electrical components where each electrical component is a laser diode or an LED. Each of the three tunnels may have the laser diode or the LED positioned therein. The three tunnels may include an upper tunnel, a lower right tunnel, and a lower left tunnel. The upper tunnel may be vertically aligned with the projectile opening and the lower right and left tunnels may be positioned relative to the projectile opening such that the light projection originating from the laser diode or the LED of each of the lower right and left tunnels indicate a potential end location of a projectile traveling out of the projectile opening.

The body may have a mechanical connection member extending therefrom. The electrical connection member may be integrated with the mechanical connection member. The mechanical connection member may be configured to mechanically couple the nozzle assembly to the barrel and facilitate an electrical connection between the electrical connection member and the battery of the blaster simultaneously. The body may have a connection flange extending therefrom. The connection flange may be configured to be inserted into a receptacle on the barrel to reinforce the mechanical coupling between the nozzle assembly and the barrel.

The blaster assembly may further include a button or a switch. The button or the switch may be coupled to the body and the electrical connection member. The button or the switch may be configured to turn on and turn off power transmitted to the electrical component from the battery via the electrical connection member.

Yet another preferred embodiment is embodied in a replaceable nozzle configured for use with a blaster. The nozzle includes a body. The body has a projectile opening defined therethrough. The projectile opening is configured to coincide with a bore of a barrel of the blaster when the nozzle is attached to the blaster. The body further includes a tunnel defined therein. The tunnel is configured to receive an electrical component. The body is configured to at least partially enclose an electrical connection member configured to electrically connect the electrical component to the blaster.

This and other embodiments may optionally include the following. The body may have three tunnels in a triangular formation defined therein. There may be three electrical components where each electrical component is a laser diode or an LED. Each of the three tunnels may have the laser diode or the LED positioned therein. The three tunnels may include an upper tunnel, a lower right tunnel, and a lower left tunnel. The upper tunnel may be vertically aligned with the projectile opening and the lower right and left tunnels may be positioned relative to the projectile opening such that the light projection originating from the laser diode or the LED of each of the lower right and left tunnels indicate a potential end location of a projectile traveling out of the projectile opening.

The body may have a mechanical connection member extending therefrom. The electrical connection member may be integrated with the mechanical connection member. The mechanical connection member may be configured to mechanically couple the body to the barrel and facilitate an electrical connection between the electrical connection member and the blaster simultaneously. The body may have a connection flange extending therefrom. The connection flange may be configured to be inserted into the blaster to reinforce the mechanical coupling between the nozzle and the barrel.

The body may have a receptacle configured to receive a button or a switch. The button or the switch may be configured to turn on and turn off power transmitted to the electrical component from the blaster via the electrical connection member.

In a preferred embodiment, the accessory power connection is configured to support or connect to interchangeable barrel nozzle accessories, such as a laser aiming system and a light system.

It will be appreciated that for some users, aiming a blaster, such as a Gel Blaster, can be difficult as the ammunition hopper may be or is in the line-of-sight. The includes of a laser for aiming, such as a three-dot laser or laser system helps improve accuracy for a user. Additionally, the separate three-spot flashlight or light system allows the blaster to be used at night.

In a preferred embodiment, power is provided to the accessory power connection at 7.4 v, which is enough amperage to power LED's and small laser diodes. Components selected preferably must adhere to this input requirement, and may include the addition of a resistor to restrict overvoltage, or overcurrent where necessary. However, this is input requirement is not a limitation on the present invention and those of ordinary skill in the art will understand that other inputs are possible.

In a preferred embodiment, the LED light system and laser system include the same diameter connection portion or they may include a shelf so that both modules can be accepted on the blaster. In addition, a front shelf may be included to house a front lens so the light system tip accessory can include additional beam forming. Mounting of the laser system tip accessory and the light system tip accessory should be considered as a surface mount technology (SMT) to printed circuit board (PCB) architecture that incorporates a power button onto the board, which preferably minimizes costs and assembling complexity. A level of ingress protection may be achieved by conformal coating added to the PCB since water coming off the Gellets may impact performance. Alternatively, a rear shield that covers the PCB backing may be used.

In a preferred embodiment, the present invention includes a nozzle or tip accessory that is embodied in a laser aiming nozzle assembly that is used for aiming and preferably includes three lasers. Preferably, the focusing be preset to optimize for the smallest diameter held at 5-25 m. The lasers preferably are Class 1 or Class 2 lasers (lowest class with best performance) for safety. The preferred lasers do not cause eye damage, and are visible up to 25-30 meters away. For example, the lasers can be a PAGOW Red Dot Laser Head, 650 nm, 5V, 5 mW, Red Laser Diode Laser Tube with Leads Head Outer Diameter 6 mm. This type of laser includes the following non-limiting, exemplary specifications, total length of 9 cm/3.54 inch, wavelength: 650 nm, working voltage: 5V, operating current: less than 20 mA, output Power: 5 mW, laser shape: Dot, outside diameter: 6 mm, working temperature: −10 degree to ~40 degree.

In a preferred embodiment, the tri-dot laser system uses a top beam to project a calibrated pinpoint where the user is pointing or aiming, and the bottom two beams spread down and out over calculated distances letting the user or the player know where their Gellets will land.

In a preferred embodiment, the top laser is to be set 0°. The bottom two lasers are set to show where the projectiles may fall based on fall rate, and error left-right rate for best angle setting to 30 meters. Preferably, the laser dots are circular in diameter grouping optimized for firing at 8-10 m. Preferably, the laser(s) are visible in daylight to 20 meters.

In a preferred embodiment, the present invention includes a tip accessory that is embodied in a light nozzle assembly that is used for providing light while using the blasters and/or for lighting up the Gellets when they are fired and includes preferably includes three lights (e.g., LEDs). A lens for focusing the light may be used. In another embodiment, the LEDs can achieve the same or greater intensity and have a more narrow viewing angle so that a focusing lens may not be necessary. An exemplary light emitter that includes a focusing lens may be the Chanzon 3 mm Flat Top LED 9000K. The LEDs may have the following specifications type: clear flat head, lens: 3 mm Diameter/Transparent/Flat, emitting color: 9000K white, luminous intensity: 800-1000 mcd, viewing angle: 30 degree, forward voltage/current: 3V-3.2V|20 mA, wattage: 0.06 W, lead length: 27 mm/28.5 mm.

Tri-LED tip assembly (with lens option): In a lighted tip assembly with one or more lenses for the LEDs to focus the beam, the target focus circle is preferably less than 1 m at a distance of 5 m. This helps enable the spotlight to providing adequate illumination in a controlled fashion.

In a preferred embodiment, a two position button power switch allows the user to selectively turn on/off power to the accessory power connection, and, therefore the laser aiming tip assembly or the light tip assembly.

The same mounting tunnels may be used for the aiming laser and LED tip assemblies. They may use the same angle, but with a light circle from each lens focus to 0.75 m diameter at 3 m.

DETAILED DESCRIPTION OF THE PREFERRED EMBODIMENTS

Figure 1A:
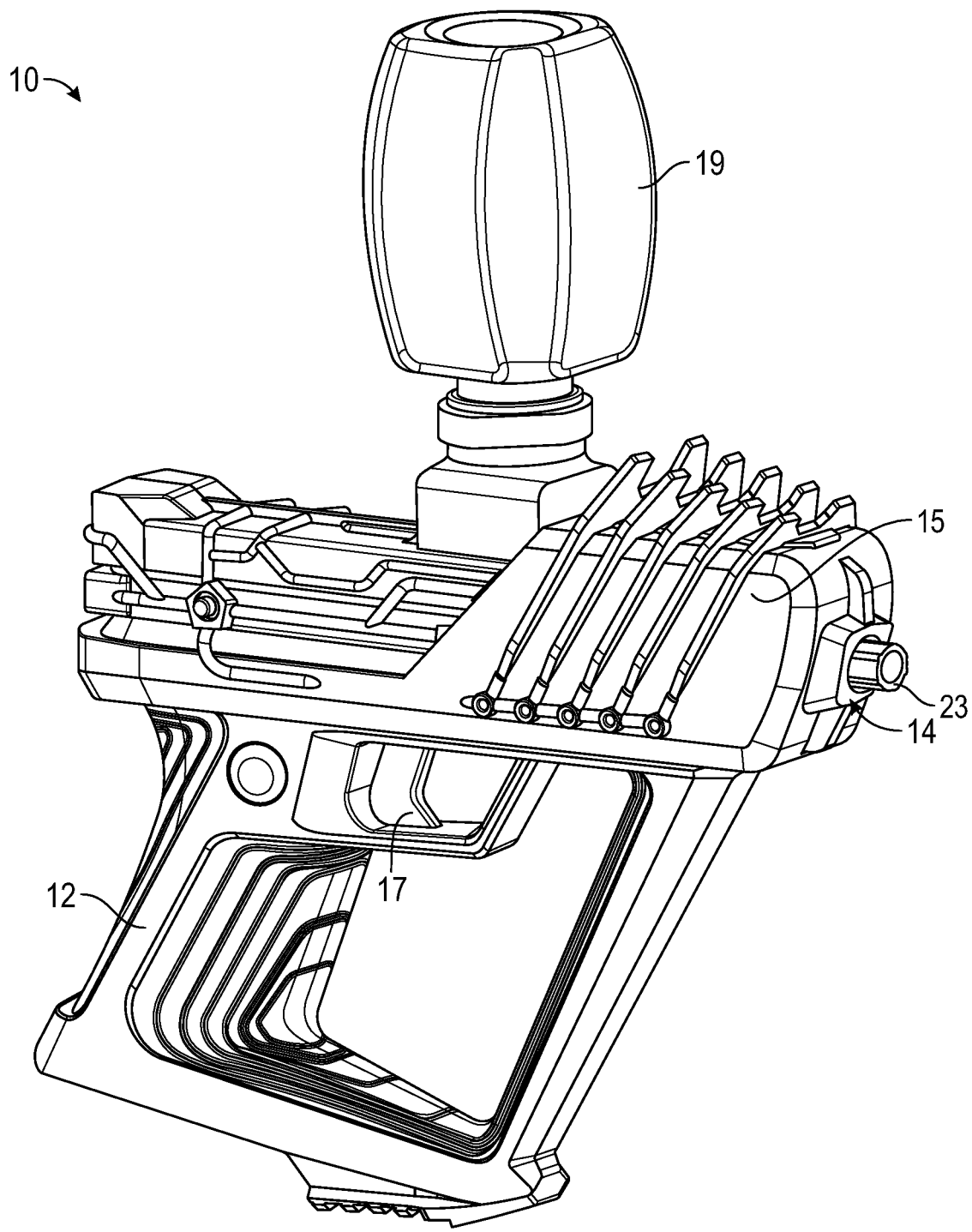
FIG. 1A is a perspective view of a blaster assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 1B:
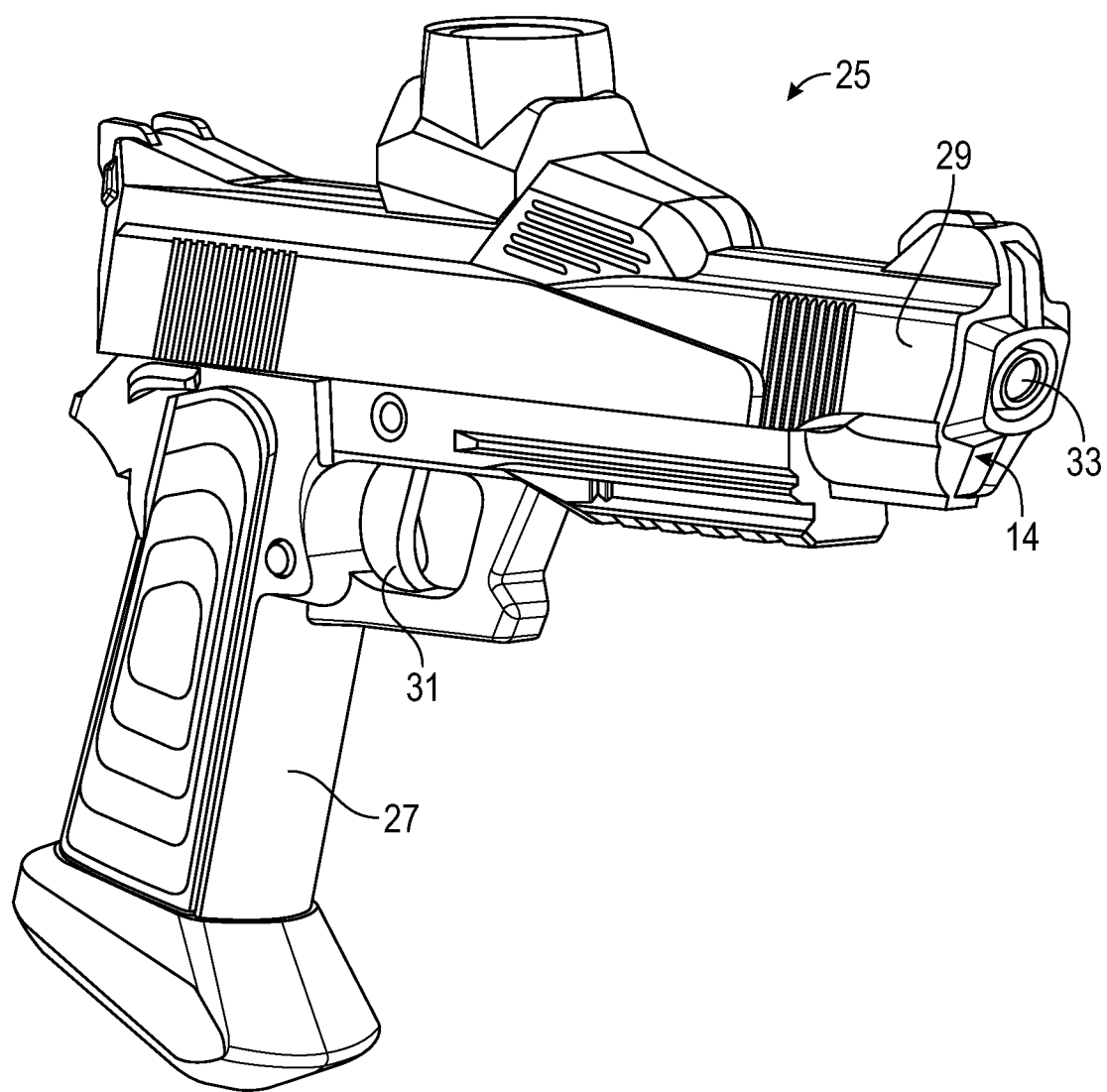
FIG. 1B is a perspective view of a blaster assembly in accordance with a preferred embodiment of the present invention.
Figure 1C:
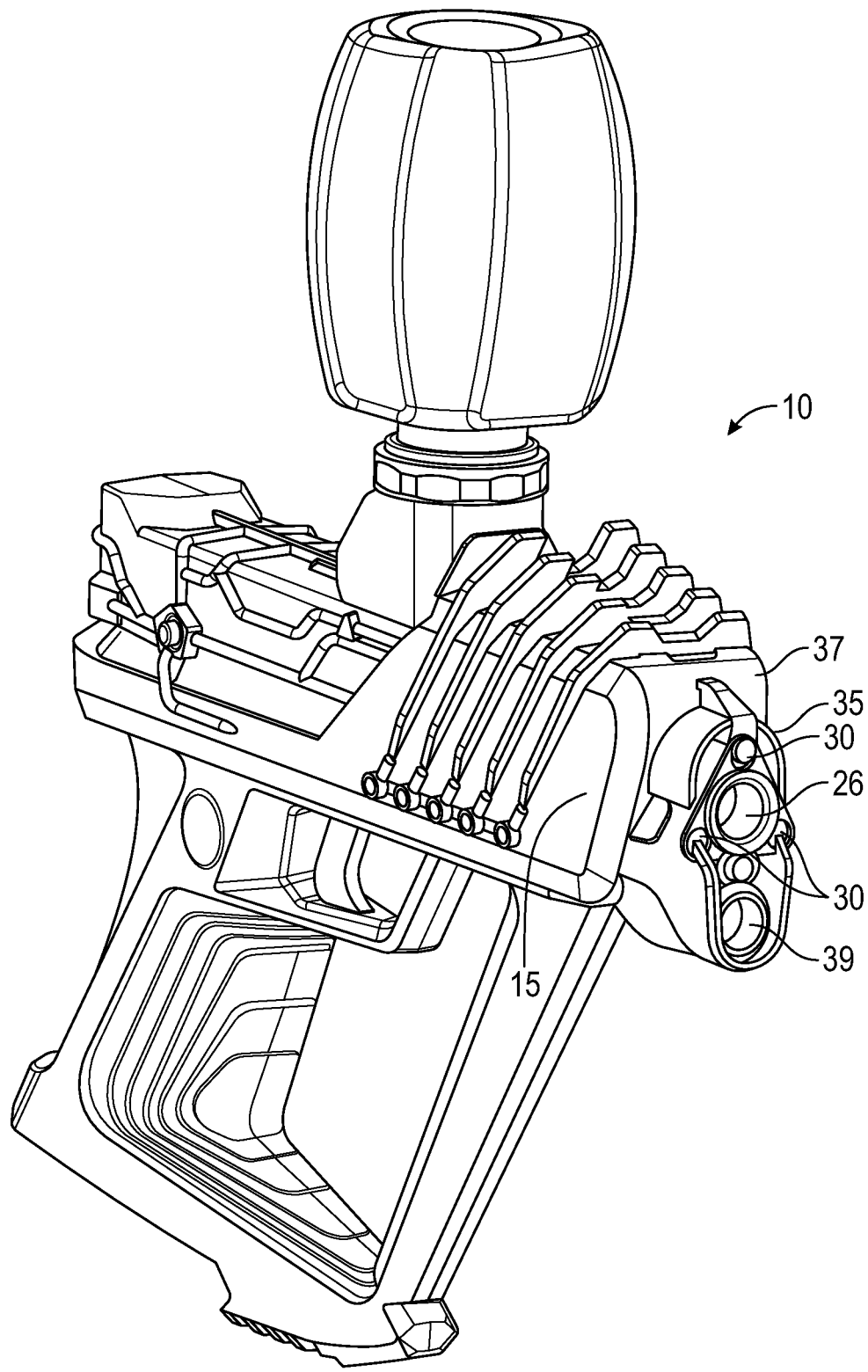
FIG. 1C is a perspective view of a blaster assembly in accordance with a preferred embodiment of the present invention.
Figure 2:
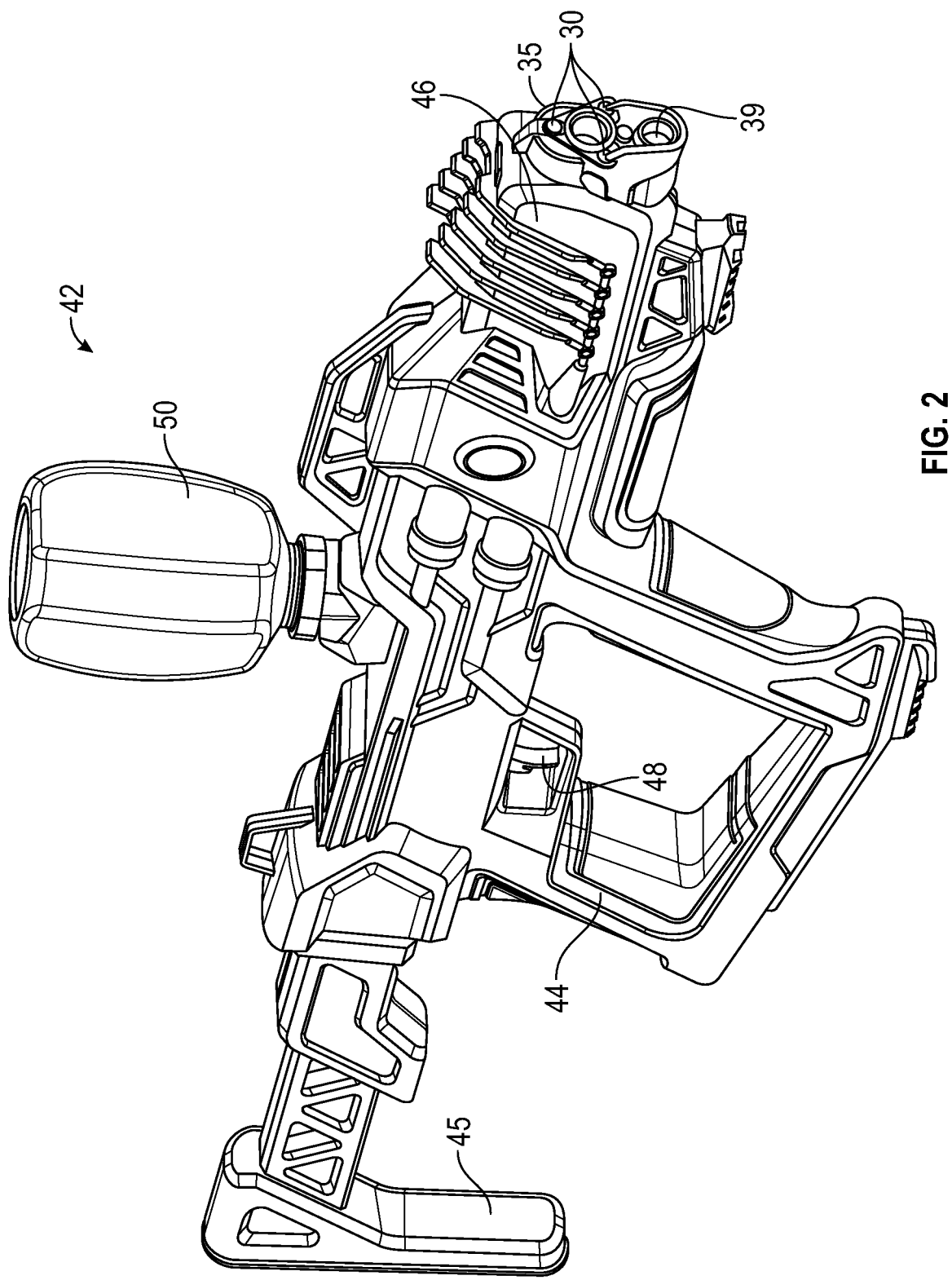
FIG. 2 is a perspective view of a blaster assembly in accordance with a preferred embodiment of the present invention.

The FIGS. 1A-10 are generally directed to powered barrel or nozzle assemblies and a variety of interchangeable or replaceable nozzle components or accessories that are configured to be used with blasters or blasters that fire projectiles. In other examples, the invention may be used in conjunction with other types of blasters. Exemplary blasters are shown in FIGS. 1A-2.

FIG. 1A is a perspective view of a blaster assembly or blaster 10. The blaster 10 is a Surge 1.5 blaster made and sold by Gel Blaster. In other examples, the blaster 10 may be other Surge blasters, such as older or newer Surge models. The blaster 10 fundamentally has physical features of a conventional handgun or a pistol. The blaster 10 may be a plastic, metal, wood, and/or glass construction. The blaster 10 may fire spherical projectiles or Gellets that are made and sold by Gel Blaster. The Gellets are water-based soft beads that burst on impact and eventually evaporate. The blaster 10 may include a handle 12, a nozzle or tip member 14, a barrel 15, a trigger 17, and a hopper 19.

The handle 12 may be used to hold and aim the blaster 10. The handle 12 may be hollow. The handle 12 may house one or more internal components of the blaster 10, such as a printed circuit board, a battery, and/or a motor.

The handle 12 may be attached to the barrel 15. The barrel 15 may be hollow. In some examples, the barrel 15 may house one or more internal components of the blaster 10, such as a printed circuit board, a battery, and/or a motor, in lieu of the handle 12. In some examples, the barrel 15 may define or house a bore 23. In some examples, the bore 23 may extend out of the barrel 15. Gellets may travel through the bore 23 once the blaster 10 is fired and exit the bore 23 to be projected towards a target. The trigger 17 may be pulled to fire the blaster 10. In some examples, the blaster 10 may have a safety mechanism such as a decocker that prevents the firing of the blaster 10 unless disengaged or deactivated.

The hopper 19 may store a supply of Gellets ready to be fired. The hopper 19 may feed Gellets to a chamber or the bore 23 in preparation for firing of the blaster 10. In some examples, a single Gellet may be fired with a single pull of the trigger 17. In some examples, multiple Gellets may be fired consecutively with a single pull of the trigger 17. In some embodiments, the blaster 10 may have an input device such as a button, a switch or a wireless electronic device where a user may set the number of Gellets to be fired with a single pull of the trigger 17. Other user configurable settings are also contemplated. For example, a user may adjust the fire rate of the blaster 10, which may include choosing among single fire, semi-automatic, and automatic firing modes.

The nozzle or tip member 14 shown in FIG. 1A may be a default or base type. The tip member 14 may be removable and, once removed, expose a female part or a receptacle that is shaped and sized to receive other tip members, nozzle assemblies, and/or nozzle accessories.

FIG. 1B is a perspective view of a blaster assembly or blaster 25. The blaster 25 is a GB2011 1.0 blaster made and sold by Gel Blaster. In other examples, the blaster 25 may be an older or newer version of the GB2011. The blaster 25 fundamentally has physical features of a conventional handgun or a pistol. The blaster 25 may be a plastic, metal, wood, and/or glass construction. The blaster 25 may fire spherical projectiles or Gellets. The Gellets may be fed to the blaster 25 via a cartridge and/or a hopper. The blaster 25 may include a handle 27, a nozzle or tip member 14, a barrel 29, and a trigger 31.

The handle 27 may be used to hold and aim the blaster 25. The handle 27 may be hollow. The handle 27 may house one or more internal components of the blaster 25, such as a printed circuit board, a battery, and/or a motor.

The handle 27 may be attached to the barrel 29. The barrel 29 may be hollow. In some examples, the barrel 29 may house one or more internal components of the blaster 25, such as a printed circuit board, a battery, and/or a motor, in lieu of the handle 27. In some examples, the barrel 29 may define or house a bore 33. In some examples, the bore 33 may extend out of the barrel 29. Gellets may travel through the bore 33 once the blaster 25 is fired and exit the bore 33 to be projected towards a target. The trigger 31 may be pulled to fire the blaster 25. In some examples, the blaster 25 may have a safety mechanism such as a decocker that prevents the firing of the blaster 25 unless disengaged or deactivated.

The nozzle or tip member 14 shown in FIG. 1B may be a default or base type. The tip member 14 may be removable and, once removed, expose a female part or a receptacle that is shaped and sized to receive other tip members, nozzle assemblies, and/or nozzle accessories.

FIG. 1C is a perspective view of the blaster 10 with a nozzle assembly 35 attachment. The nozzle assembly 35 may be attached to the blaster 10 by removing the tip member 14 (see FIG. 1A) to expose a female part(s) or receptacle(s) and mating or coupling male part(s) of the nozzle assembly 35 with the female part(s) or receptacle(s). In other examples, the nozzle assembly 35 may be attached over the tip member 14 without removing the tip member 14 from the blaster 10 via conventional fastening methods such as snap fitment, screws, clips, and/or the like. The nozzle assembly 35 may be attached to the blaster 10 from or near a distal end 37 of the barrel 15.

The nozzle assembly 35 may include a projectile opening 26. The projectile opening 26 may have a circular shape. The projectile opening 26 may coincide with the bore 23 (see FIG. 1A) when the nozzle assembly 35 is attached to the blaster 10. The positioning of the projectile opening 26 relative to the bore 23 may be such that the path of a projectile being fired is not structurally interfered by the projectile opening 26.

The nozzle assembly 35 may include electrical components. The electrical components may include a laser diode, an LED, a light bulb, or any other light source by example. The light source(s) may project light having different shapes, visual patterns, dynamic patterns, frequencies, wavelengths, colors, brightness, etc. For example, the light source(s) may project refracted patterns, reticles, aiming shapes, and the like. FIG. 1C shows the nozzle assembly 35 having multiple laser diodes or emitters 30 and a flashlight 39. A user may generally provide lighting towards a direction aimed at to improve visibility and line of sight via the flashlight 39 and improve shot accuracy by visualizing aim via the laser projections emitted from the laser emitters 30. The laser emitters 30 may be disposed around the projectile opening 26. The flashlight 39 may be disposed under the projectile opening 26. The positioning and quantity of the laser emitters 30 and the flashlight 39 shown in FIG. 1C are only by example. Other examples as well as the positional configurations, powering, and controls of the electrical components are discussed in future paragraphs.

FIG. 2 is a perspective view of a blaster assembly or blaster 42 with a nozzle assembly 35 attachment. The blaster 42 fundamentally has physical features of a conventional rifle. The blaster 42 may be a plastic, metal, wood, and/or glass construction. The blaster 42 may fire spherical projectiles or Gellets that are made and sold by Gel Blaster. The blaster 42 may include a handle 44, a butt 45, a barrel 46, a trigger 48, and a hopper 50.

The handle 44 may be used to hold and aim the blaster 42. The handle 44 may be hollow. The handle 44 may house one or more internal components of the blaster 42, such as a printed circuit board, a battery, and/or a motor. The butt 45 may be used to rest the blaster 42 against a body of a user when aiming and firing the blaster 42.

The handle 44 may be attached to the barrel 46. The barrel 46 may be hollow. In some examples, the barrel 46 may house one or more internal components of the blaster 42, such as a printed circuit board, a battery, and/or a motor, in lieu of the handle 44. In some examples, the barrel 46 may define or house a bore similar to the bores 23, 33 (see FIGS. 1A-1B). In some examples, the bore may extend out of the barrel 46. Gellets may travel through the bore once the blaster 42 is fired and exit the bore to be projected towards a target. The trigger 48 may be pulled to fire the blaster 42. In some examples, the blaster 42 may have a safety mechanism such as a decocker that prevents the firing of the blaster 42 unless disengaged or deactivated.

The hopper 50 may store a supply of Gellets ready to be fired. The hopper 50 may feed Gellets to a chamber or the bore in preparation for firing of the blaster 42. In some examples, a single Gellet may be fired with a single pull of the trigger 48. In some examples, multiple Gellets may be fired consecutively with a single pull of the trigger 48. In some examples, the blaster 42 may have an input device such as a button, a switch or a wireless electronic device where a user may set the number of Gellets to be fired with a single pull of the trigger 48. Other user configurable settings are also contemplated. For example, a user may adjust the fire rate of the blaster 42, which may include choosing among single fire, semi-automatic, and automatic firing modes.

The blaster 42 may have a nozzle or tip member similar to the tip member 14 shown in FIG. 1A. The tip member may be removable and, once removed, expose a female part or a receptacle that is shaped and sized to receive other tip members, nozzle assemblies, and/or nozzle accessories. In FIG. 2, the blaster 42 is shown featuring the nozzle assembly 35, which includes multiple laser emitters 30 and a flashlight 39.

Figure 3:
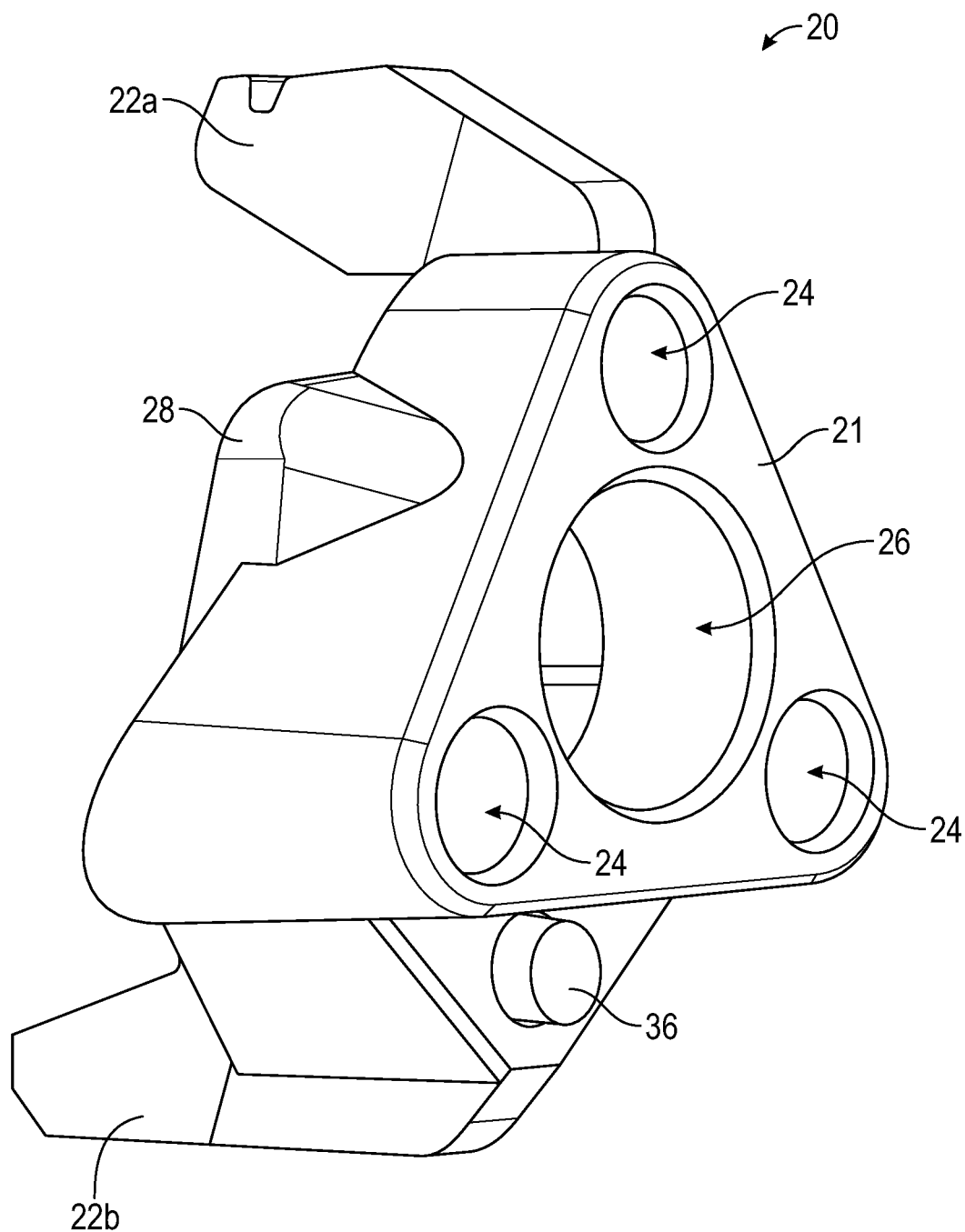
FIG. 3 is an isolated front perspective view of a replaceable nozzle in accordance with a preferred embodiment of the present invention.
Figure 4:
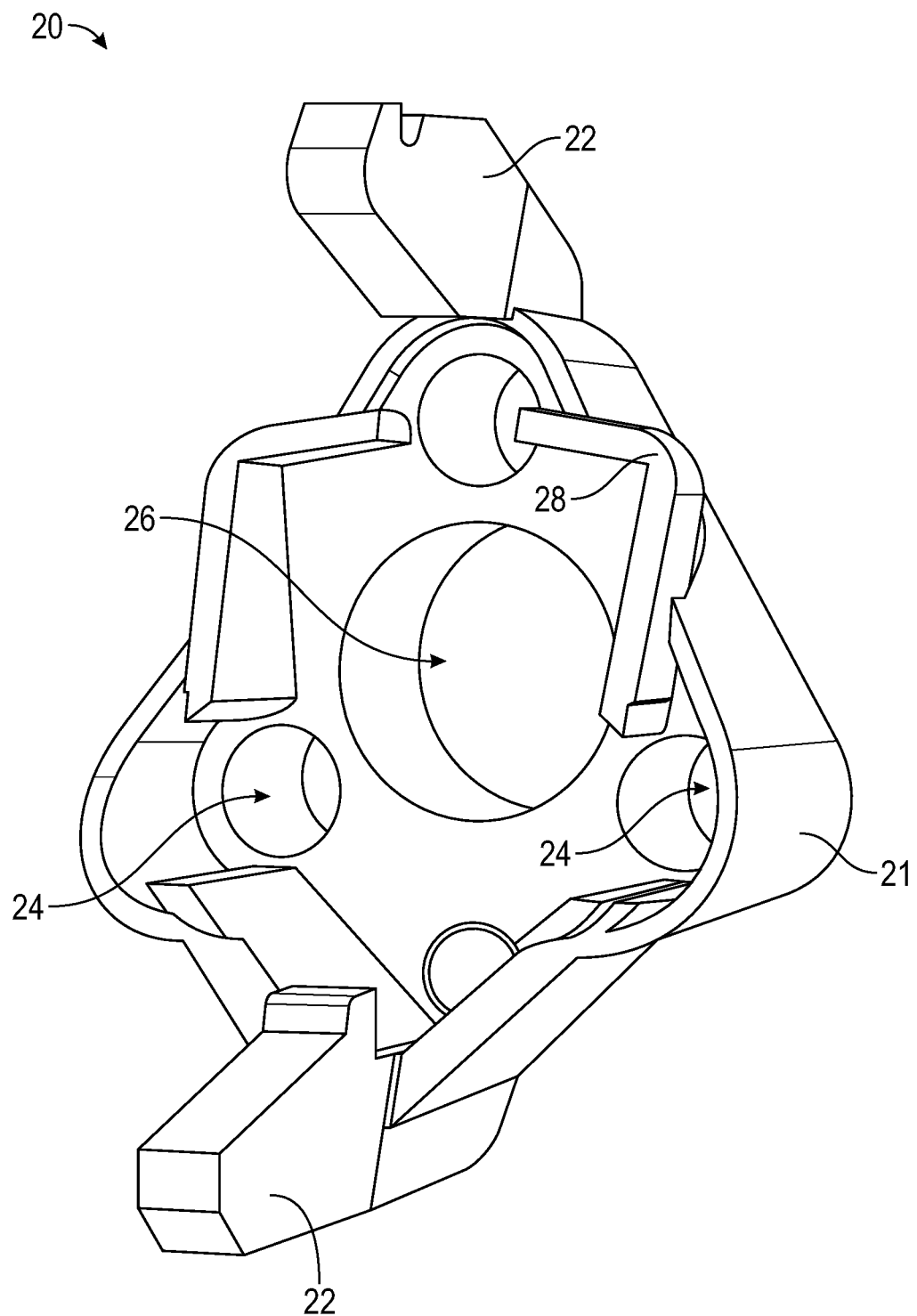
FIG. 4 is an isolated rear perspective view of the replaceable nozzle of FIG. 3 in accordance with a preferred embodiment of the present invention.

FIG. 3 is an isolated front perspective view of a replaceable nozzle 20 and FIG. 4 is an isolated rear perspective view of the replaceable nozzle 20. The nozzle 20 may be used in the laser aiming nozzle assembly 16 (see FIG. 5), the light nozzle assembly 18 (see FIG. 6), and the nozzle assembly 35 (see FIG. 1C), which is a hybrid. The nozzle 20 may be compatible with blaster 10 (see FIG. 1A), blaster 25 (see FIG. 1B), and blaster 42 (see FIG. 2). The nozzle 20 includes a main body portion 21. The body portion 21 includes m mechanical connection members: upper connection member 22a and a lower connection member 22b, collectively referred to as connection members 22, extending therefrom. The connection members 22 may have arm, claw, or hook-like structures. The connection members 22 may fasten to a distal end of a barrel of a blaster. The distal end of the barrel may have a female part or a receptacle, such as a recess, cavity, hole, groove, and the like, that is shaped and sized to receive one of the connection members 22. The mating may be a snap fitment by example.

The nozzle 20 may include one or more connection flanges 28. The connection flanges 28 may fasten to a distal end of a barrel of a blaster, thereby providing added structural support and reinforcement to the connection members 22 for the mating between the nozzle 20 and a blaster. The distal end of the barrel may have a female part or a receptacle, such as a recess, cavity, groove, channel and the like, that is shaped and sized to receive one of the connection flanges 28. The mating may be a snap fitment by example.

The nozzle 20 may include a projectile opening 26. The projectile opening 26 may be aligned with a bore of a blaster such that a projectile being fired is not interfered by the nozzle 20 along its path. The nozzle 20 may further include one or more tunnels 24. Three tunnels 24 are shown in FIG. 3 by example. In other examples, there may be more or less tunnels 24. The three tunnels 24 may be disposed around the projectile opening 26 to form a triangle as shown in FIG. 3. Each of the tunnels 24 may receive an electronic component such as a laser emitter 30 (see FIG. 5) and/or a light emitter 32 (see FIG. 6).

The nozzle 20 may have a button 36. In other examples, the button 36 may be a switch, dial, knob, and/or the like. The button 36 may control power transmitted to the electrical components of the nozzle assemblies. For example, the button 36 may be pressed to turn a laser emitter 30 on and off. In some examples, the button 36 may perform different functions based on variation in input, such as sequential pressing or duration of pressing. For example, pressing the button 36 once may turn on one electrical component, pressing the button 36 longer than a predetermined duration may turn on all electrical components, and pressing the button 36 a predetermined amount of times sequentially may turn on some electrical components.

Figure 5:
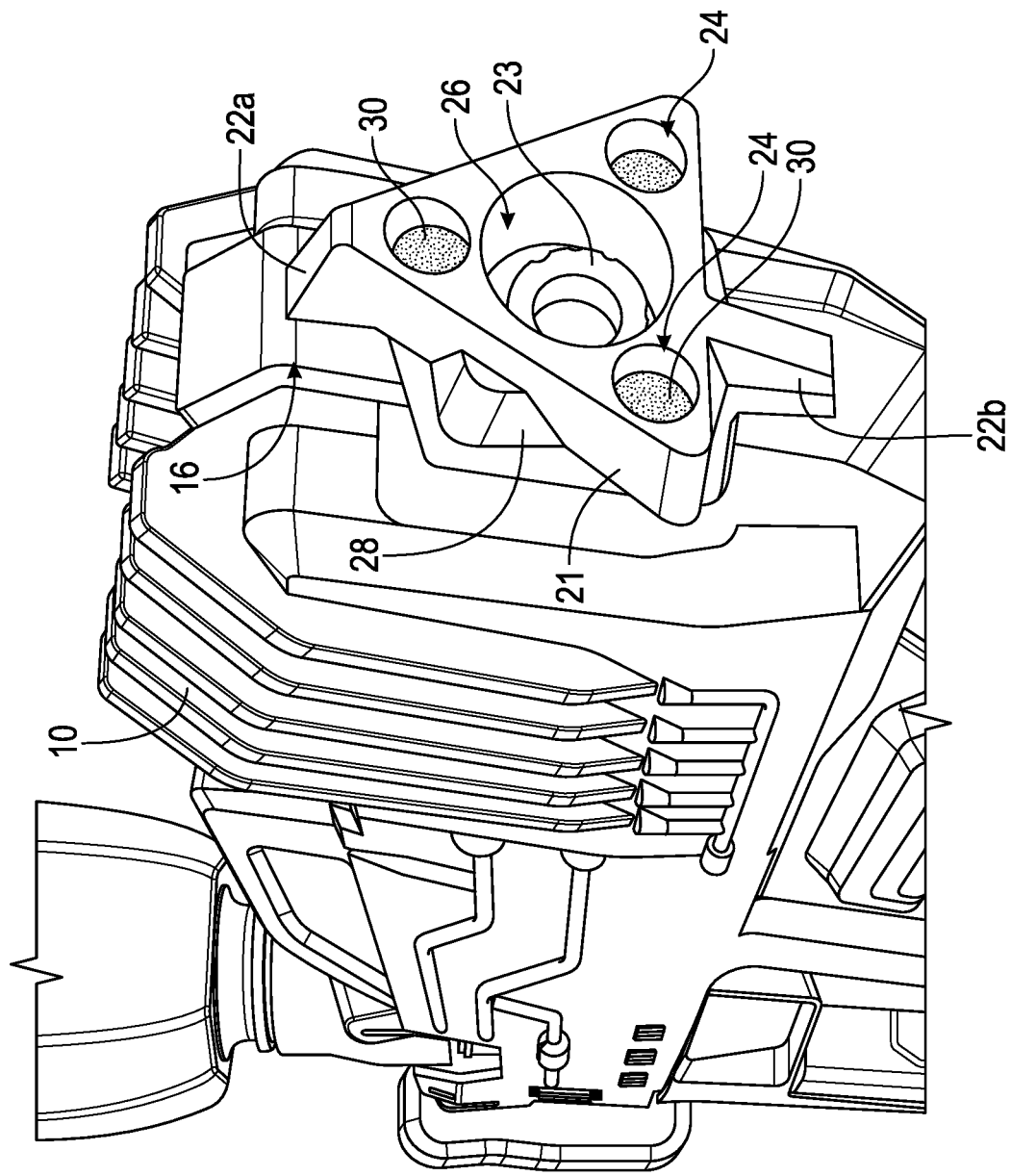
FIG. 5 is a magnified perspective view of a nozzle assembly attached to a blaster in accordance with a preferred embodiment of the present invention.

FIG. 5 is a magnified perspective view of a nozzle assembly or a laser aiming nozzle assembly 16 attached to the blaster 10. The nozzle 20 (see FIGS. 4-5) is incorporated into the laser aiming nozzle assembly 16. As such, the laser aiming nozzle assembly 16 includes a main body portion 21, an upper connection member 22a and a lower connection member 22b extending from the main body portion 21, and connection flanges 28. Each of the tunnels 24 of the nozzle 20 house laser emitters 30. The projectile opening 26 may be distally offset from the bore 23 such that the bore 23 does not extend out of the nozzle 20. This may allow for the laser emitters 30 to have a clear path for projection that is not interrupted by the bore 23.

Figure 6:
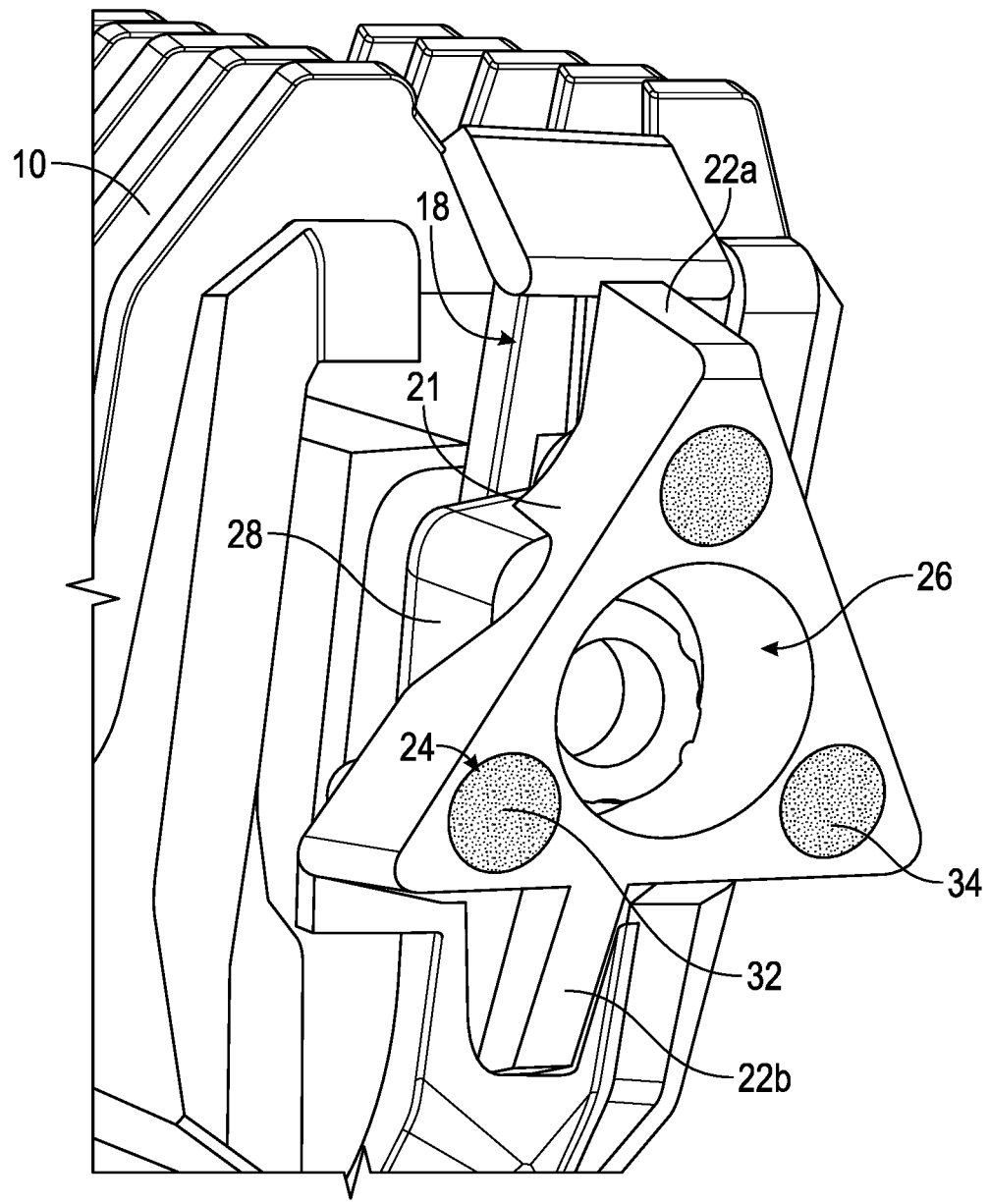
FIG. 6 is a magnified perspective view of a nozzle assembly attached to a blaster in accordance with a preferred embodiment of the present invention.

FIG. 6 is a magnified perspective view of a nozzle assembly or a light nozzle assembly 18 attached to the blaster 10. The nozzle 20 (see FIGS. 4-5) is incorporated into the light nozzle assembly 18. As such, the light nozzle assembly 18 includes a main body portion 21, an upper connection member 22a and a lower connection member 22b extending from the main body portion 21, and connection flanges 28. Each of the tunnels 24 of the nozzle 20 house light emitters 32, which may be LEDs. One or more lenses 34 may be disposed distally from each light emitter 32. The lenses 34 may provide protection for the light emitters 32 as well as focus the light emitted. The projectile opening 26 may be distally offset from the bore 23 such that the bore 23 does not extend out of the nozzle 20. This may allow for the light emitters 32 to have a clear path for projection that is not interrupted by the bore 23.

Figure 7:
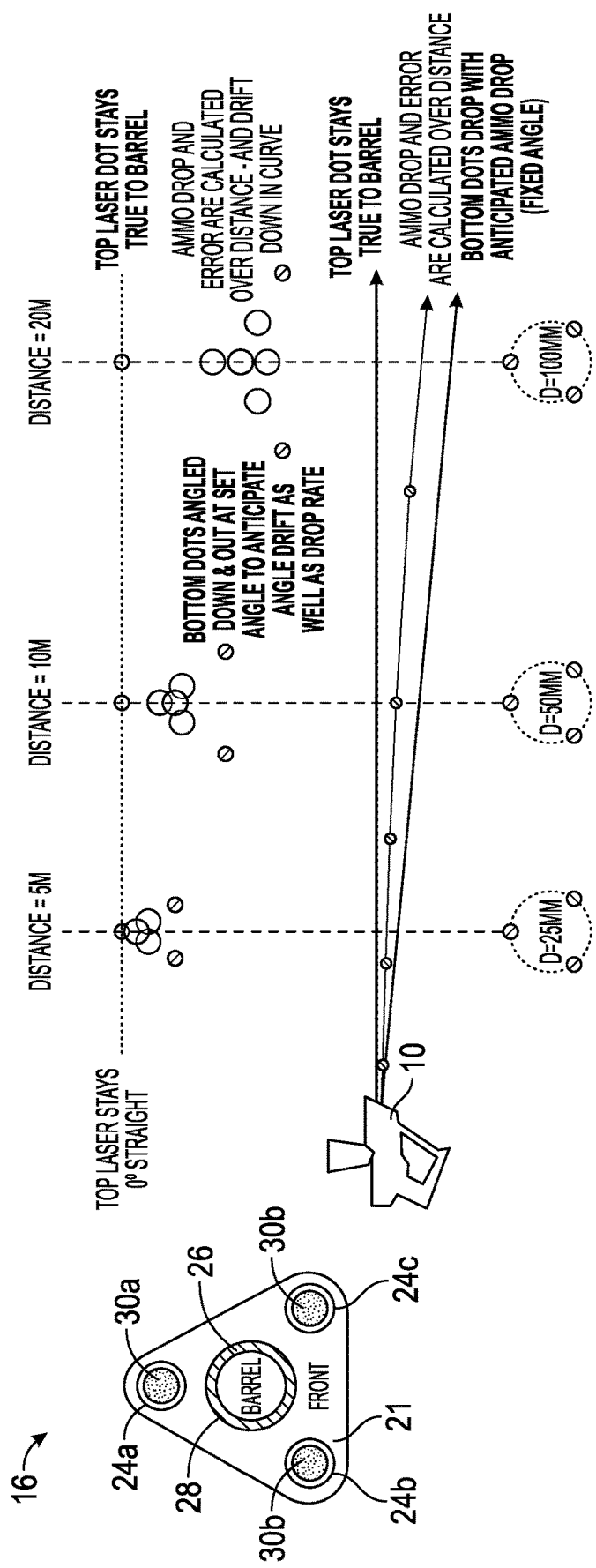
FIG. 7 is a schematic of a nozzle assembly and exemplary projectile trajectories of a blaster equipped with the nozzle assembly in accordance with a preferred embodiment of the present invention.

FIG. 7 is a schematic of the laser aiming nozzle assembly 16 and exemplary projectile trajectories of a blaster equipped with laser aiming nozzle assembly 16. All text on the drawings is incorporated by reference herein. The blaster 10 is shown in FIG. 7 as an example. The schematic of FIG. 7 illustrates the purpose of the positional arrangement of the laser emitters 30. The laser emitters 30 may be positioned around the projectile opening 26 such that a triangle is formed among the laser emitters 30. The laser emitters 30 refer to a laser emitter 30a of an upper tunnel 24a, a laser emitter 30b a lower right tunnel 24b, and a laser emitter 30c of a lower left tunnel 24c. The laser emitter 30a is set at 0° such that the laser emitter 30a is vertically aligned with the projectile opening 26. This positioning allows the laser emitter 30a to stays true to the projectile opening 26. The laser emitters 30a, 30b are positioned to show where a fired projectile may fall based on fall or drop rate and error left-right, drift, or lateral error rate. In some examples, the laser emitters 30a, 30b may angled up or down in place at a predetermined angle. The predetermined angle may also be based on the drop rate and the lateral error rate. The drop rate may refer to the tendency of the projectile to fall relative to the originally aimed location. The lateral error rate may refer to the tendency of the projectile to land to the left or the right of the originally aimed location. The drop rate and the lateral error rate may be calculated over distance. For example, as shown in FIG. 7, firing at a target 5 m (meter in metric units) away may result in a change of 25 mm, firing at a target 10 m away may result in a change of 50 mm, and firing a at a target 20 m away may result in a change of 1 cm.

Figure 8:
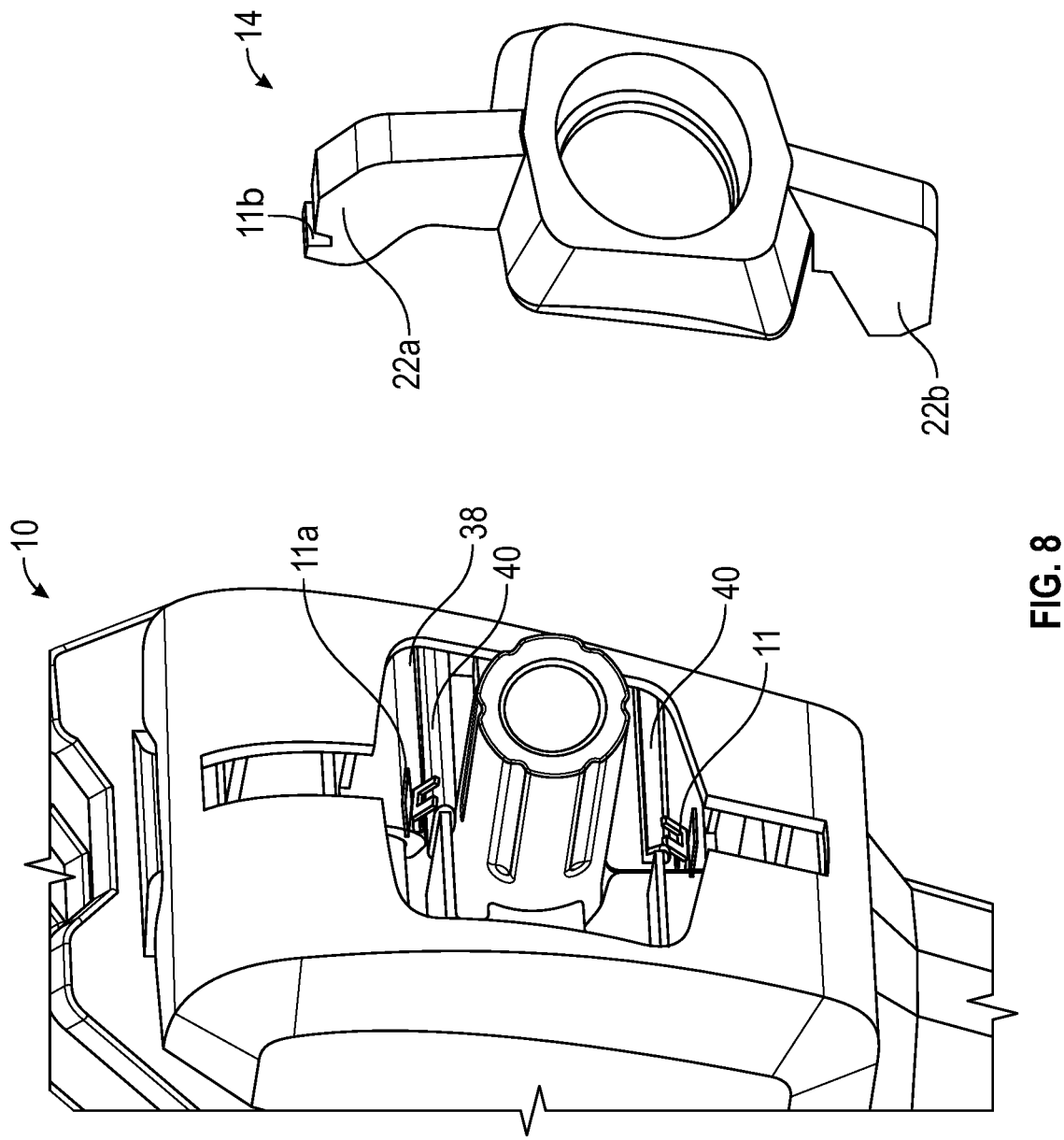
FIG. 8 is an exploded perspective partial view of the blaster assembly of FIG. 1A in accordance with a preferred embodiment of the present invention.

FIG. 8 is an exploded perspective partial view of the blaster 10. FIG. 8. The blaster 10 may include one or more electrical connection members or terminals 11a. All nozzle assemblies discussed herein may further include one or more electrical connection members or terminals 11b. The tip member 14 is shown in FIG. 8 as an example for simplification. The terminals 11a, 11b may be collectively referred to as terminals 11. The terminals 11a may be positioned anywhere within a front nozzle recess 38. In some examples, the terminals 11a may be mounted on posts 40. In other examples, a flange, a shelf or a wall may also be used for mounting the terminals 11a. The terminals 11b may be positioned anywhere such that the terminals 11 make contact with each other once the nozzle assembly is attached to the blaster 10. In an example, the terminals 11b may be integrated with the connection members 22 and/or the connection flanges 28. In such examples, once the nozzle assembly is mechanically coupled to the blaster 10, the nozzle assembly may also be electrically coupled to the blaster 10.

Figure 9:
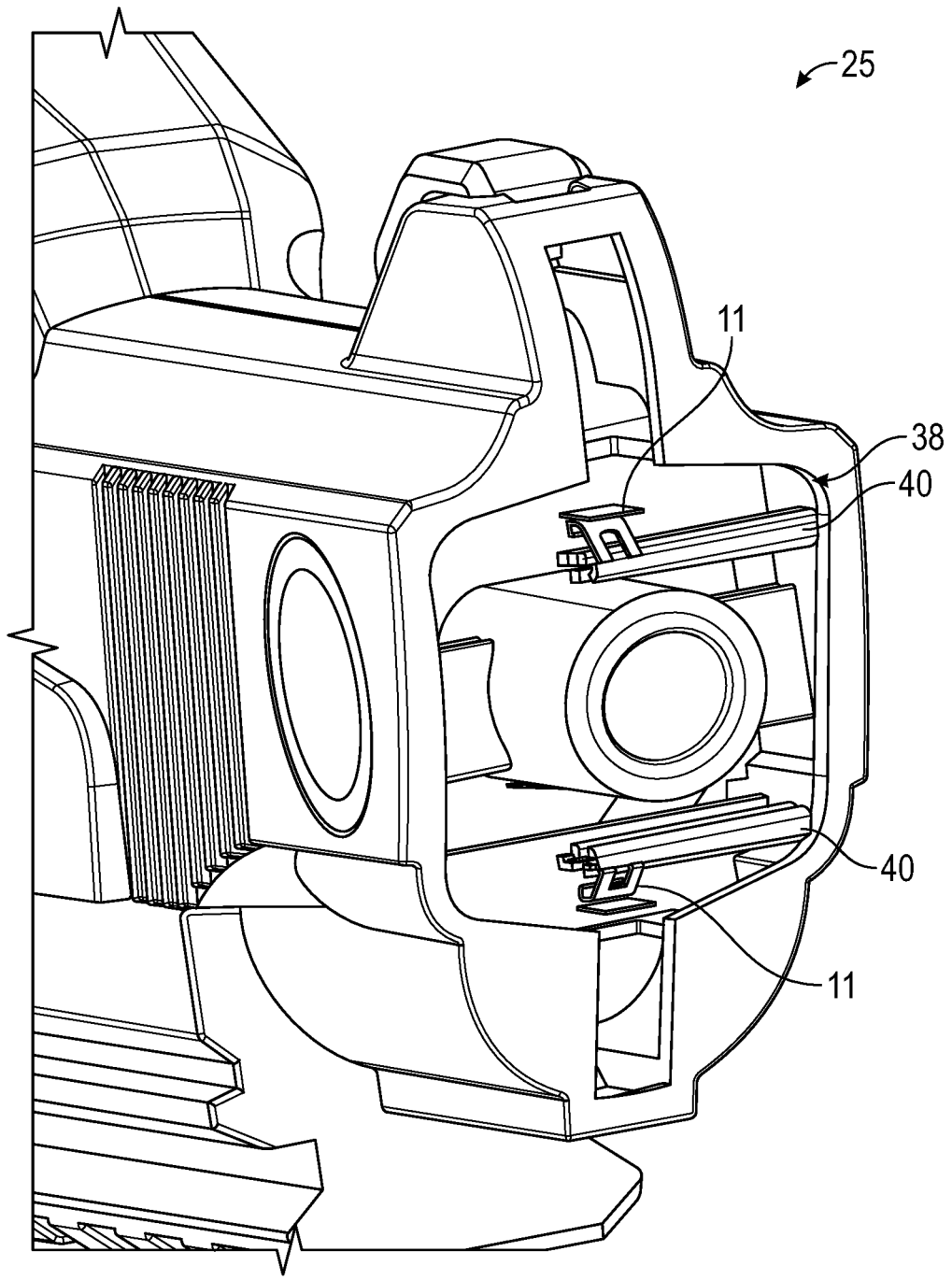
FIG. 9 is a perspective partial view of the blaster assembly of FIG. 1B in accordance with a preferred embodiment of the present invention.

FIG. 9 is a perspective partial view of the blaster 25. The blaster 25 may include one or more electrical connection members or terminals 11. The terminals 11 may be positioned anywhere within a front nozzle recess 38. In some examples, the terminals 11 may be mounted on posts 40. In other examples, a flange, a shelf or a wall may also be used for mounting the terminals 11. It will be appreciated that the terminals or electrical connections that mate with or connect to the terminals 11 in the front nozzle recess 38 may be located proximally on any nozzle assembly discussed herein. The terminals on the nozzle assemblies may be positioned anywhere such that the terminals make contact with each other once the nozzle assembly is attached to the blaster 25. In some examples, once the nozzle assembly is mechanically coupled to the blaster 25, the nozzle assembly may also be electrically coupled to the blaster 25.

Figure 10:
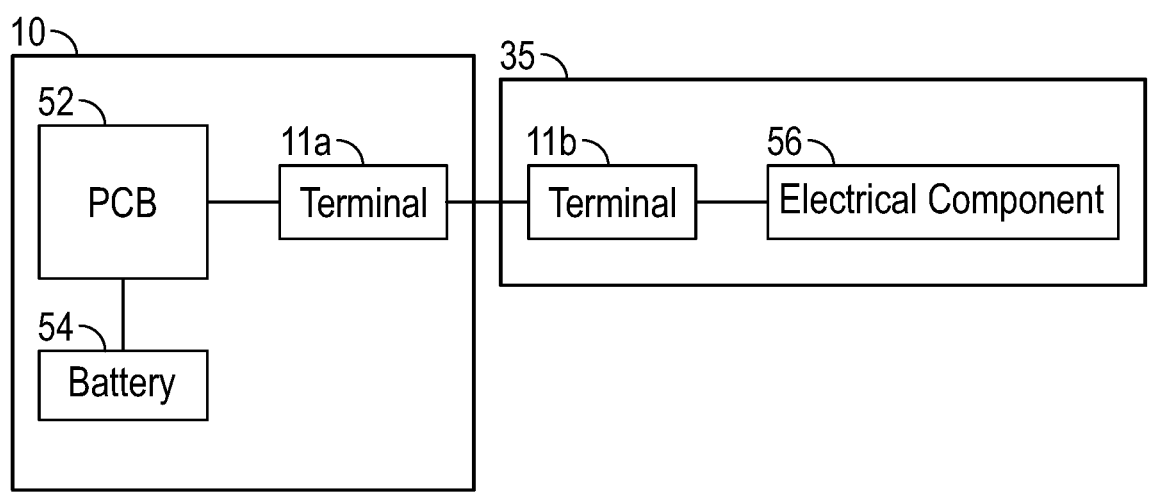
FIG. 10 is a schematic of electrical components of a blaster assembly in accordance with a preferred embodiment of the present invention.

FIG. 10 is a schematic of electrical components of a blaster 10 and a nozzle assembly 35. The blaster 10 and the nozzle assembly 35 are shown in FIG. 10 by example and not to exclude blasters and nozzle assemblies discussed herein may have same or similar specifications. The blaster 10 may include a PCB 52, a battery 54, and a terminal 11a.

The PCB 52 may connect electronic components of the blaster 10 to each other. In some examples, the PCB 52 may be replaced by another conventional electronic medium. The electronic components may be attached to the PCB 52 via SMT or another method known in the art. The PCB 52 may include a processor to execute machine readable instructions and controller to actuate other electronic components of the blaster 10.

The battery 54 may provide power to the blaster 10 and other devices, components, and/or accessories electrically coupled to the blaster 10. The battery 54 may transmit power to an output terminal 11a to power external connections. The terminal 11a and the battery 54 may be electrically connected to each other via the PCB 52.

The nozzle assembly 35 may include an input terminal 11b to receive power from external sources. The terminal 11b may be electrically connected to electrical components 56, which include laser emitters 30 (see FIG. 1C) and a flashlight 39 (see FIG. 1C) by example. Once the terminal 11a and the terminal 11b contact each other to conduct electricity, the electrical components 56 may draw power from the battery 54 and turn on.

In some embodiments, the nozzle assembly 35 may also includes a PCB or the like for controlling the nozzle assembly 35 (e.g., turning electrical components 56 on and off, adjusting the brightness of diodes, cycling through or choosing different colors, flashing, etc.). The electrical components 56 may also be mounted on or connected to the PCB.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or suboperations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A toy blaster assembly comprising:
a toy blaster that includes a housing defining a housing interior and a battery, wherein the housing includes a distal end having a front nozzle recess defined therein and a barrel that includes a hollow bore extending therethrough, and wherein the bore defines a bore axis; and
a nozzle assembly attachable to the distal end of the housing of the toy blaster, the nozzle assembly comprising:
a main body portion having a projectile opening extending therethrough, wherein the projectile opening defines a projectile opening axis that is coaxial with the bore axis, wherein at least a portion of the main body portion of the nozzle assembly is positioned forwardly of the distal end of the housing, and wherein at least a portion of the nozzle assembly extends through the front nozzle recess and into the housing interior;
an electrical component associated with the main body portion; and
a first nozzle electrical connection member configured to transmit power from the battery to the electrical component.

2. The toy blaster assembly of claim 1 wherein the main body portion has a tunnel defined therein, the tunnel having the electrical component positioned therein.

3. The toy blaster assembly of claim 1 wherein the electrical component is a flashlight.

4. The toy blaster assembly of claim 1 wherein the electrical component is three electrical components, each electrical component being a laser diode or an LED, wherein the three electrical components are arranged in a triangular formation around the projectile opening.

5. The toy blaster assembly of claim 1 further comprising a button or a switch coupled to the main body portion and the electrical connection member, the button or the switch configured to turn on and turn off power transmitted to the electrical component from the battery via the electrical connection member.

6. A toy blaster assembly comprising:
a toy blaster that includes a housing defining a housing interior and a battery, wherein the housing includes a distal end having a front nozzle recess defined therein and a barrel that includes a hollow bore extending therethrough, and wherein the bore defines a bore axis, wherein the front nozzle recess includes a central portion and an upper slot portion extending upwardly from the central portion; and
a nozzle assembly attachable to the distal end of the housing of the toy blaster, the nozzle assembly comprising:
a main body portion having a projectile opening extending therethrough, wherein the projectile opening defines a projectile opening axis that is coaxial with the bore axis, wherein at least a portion of the main body portion of the nozzle assembly is positioned forwardly of the distal end of the housing, wherein the main body portion includes an upper connection member extending rearwardly therefrom, and wherein the upper connection member extends through the upper slot portion of the front nozzle recess and into the housing interior;
an electrical component associated with the main body portion; and
a first nozzle electrical connection member configured to transmit power from the battery to the electrical component.

7. The toy blaster assembly of claim 6 wherein the main body portion has a connection flange extending therefrom, wherein the connection flange is received in the central portion of the front nozzle recess.

8. A nozzle assembly configured for use with a toy blaster having a barrel defining a hollow bore therethrough that defines a barrel axis, a housing defining a housing interior with a distal end, and a battery, the nozzle assembly comprising:
- a main body portion having a projectile opening extending therethrough, wherein the projectile opening defines a projectile opening axis that is coaxial with the bore axis;
- an electrical component associated with the main body portion; and
- a first nozzle electrical connection member configured to transmit power from the battery to the electrical component, wherein at least a portion of the nozzle assembly is configured to extend through a front nozzle recess defined in the housing and into the housing interior of the toy blaster.

9. The nozzle assembly of claim 8 wherein the main body portion includes an upper connection member extending rearwardly therefrom, and wherein the upper connection member is configured to extend through an upper slot portion of the front nozzle recess and into the housing interior.

10. The nozzle assembly of claim 8 wherein the electrical component is a flashlight.

11. The nozzle assembly of claim 8 wherein the electrical component is three electrical components, each electrical component being a laser diode or an LED, wherein the three electrical components are arranged in a triangular formation around the projectile opening.

12. A nozzle assembly configured for use with a toy blaster having a barrel defining a hollow bore therethrough that defines a barrel axis, a housing defining a housing interior with a distal end, and a battery, the nozzle assembly comprising:
- a main body portion having a projectile opening extending therethrough, wherein the projectile opening defines a projectile opening axis that is coaxial with the bore axis;
- an electrical component associated with the main body portion; and
- a first nozzle electrical connection member configured to transmit power from the battery to the electrical component, wherein the projectile opening of the nozzle assembly includes a distal end, and wherein the distal end of the projectile opening is configured to be positioned forwardly of a distal end of the hollow bore when the nozzle assembly is used with the toy blaster.

13. A nozzle assembly configured for use with a toy blaster having a barrel defining a bore therethrough, a housing defining a housing interior with a distal end that includes a front nozzle recess defined therein and a battery, the nozzle assembly comprising:
- a main body portion having a projectile opening defined therethrough, the projectile opening configured to coincide with a central portion of the front nozzle recess and the bore when the nozzle assembly is attached to the toy blaster, wherein at least a portion of the nozzle assembly is configured to extend through the front nozzle recess and into the housing interior when the nozzle assembly is attached to the toy blaster;
- an electrical component associated with the main body portion; and
- a first nozzle electrical connection member associated with the main body portion and configured to electrically connect the electrical component to the toy blaster.

14. The nozzle assembly of claim 13 wherein the main body portion includes an upper connection member extending therefrom, the upper connection member configured to extend through an upper slot portion of the front nozzle recess and into the housing interior when the nozzle assembly is attached to the toy blaster.

15. The nozzle assembly of claim 13 wherein the electrical component is a flashlight.

16. The nozzle assembly of claim 13 wherein the electrical component is three electrical components, each electrical component being a laser diode or an LED, wherein the three electrical components are arranged in a triangular formation around the projectile opening.

\* \* \* \* \*